United States Patent
Hopper, II

[11] Patent Number: 5,852,902
[45] Date of Patent: Dec. 29, 1998

[54] LOCKING ENTRY GRID

[75] Inventor: James J. Hopper, II, Wichita, Kans.

[73] Assignee: Balco Metalines, Inc., Wichita, Kans.

[21] Appl. No.: 886,386

[22] Filed: Jul. 1, 1997

[51] Int. Cl.[6] .................................................. E04F 17/10
[52] U.S. Cl. ................................ 52/177; 52/667; 52/669
[58] Field of Search .............................. 52/177, 180, 181, 52/667, 669

[56] References Cited

U.S. PATENT DOCUMENTS

| | | | |
|---|---|---|---|
| 3,369,337 | 2/1968 | Butler .......................................... | 52/667 |
| 3,383,822 | 5/1968 | Viehmann et al. ......................... | 52/667 |
| 3,783,471 | 1/1974 | McGeary et al. ....................... | 52/181 X |
| 4,112,640 | 9/1978 | Reifsnyder ................................ | 52/177 |
| 4,522,009 | 6/1985 | Fingerson ............................... | 52/177 X |
| 4,555,886 | 12/1985 | Wiechowski ........................... | 52/177 X |
| 4,654,245 | 3/1987 | Balzer et al. . | |
| 4,727,704 | 3/1988 | Carlton .................................. | 52/177 X |
| 4,952,434 | 8/1990 | Rumsey et al. . | |
| 5,513,472 | 5/1996 | Olsen et al. ............................. | 52/177 |

OTHER PUBLICATIONS

Dirt Control Foot Mats & Gratings; J.L. Industries; 12690/JLI, BuyLine 3573; 1997.

Tough Grilles; "Dura–Spaced" Foot Grilles and Floor Mats; Kenagrille and Ken–a–Mat; K.N. Crowder Mfg. Inc.

Entrance Mats, Lobby Tiles Showcase, Half a Century of Service; American Floor Products Co., Inc.; 12690/AME, BuyLine 0016; 1997.

C/S Entrance Mat Systems; CS Group; 12690/CON, BuyLine 1011; 1997.

Pro–Tek Impact Protection Systems, Architectural Gratings and Mats; Pawling Corporation; 12690/PAW, BuyLine 0413; 1997.

Perfec Clean, Dirt Control Foot Mats & Grattings; Reese; 12690/REE, BuyLine 3090; 1997.

*Primary Examiner*—Christopher Kent
*Assistant Examiner*—Timothy B. Kang
*Attorney, Agent, or Firm*—Hovey, Williams, Timmons & Collins

[57] ABSTRACT

An entry grid includes a plurality of spaced, side-by-side, grid sections each having a tread rail and a depending support leg with sections interlocked by a locking bar extending transversely through respective locking holes in the support legs. The support legs include locking teeth engaged by complementally configured element teeth of corresponding locking elements extending radially from the locking bar shaft.

22 Claims, 2 Drawing Sheets

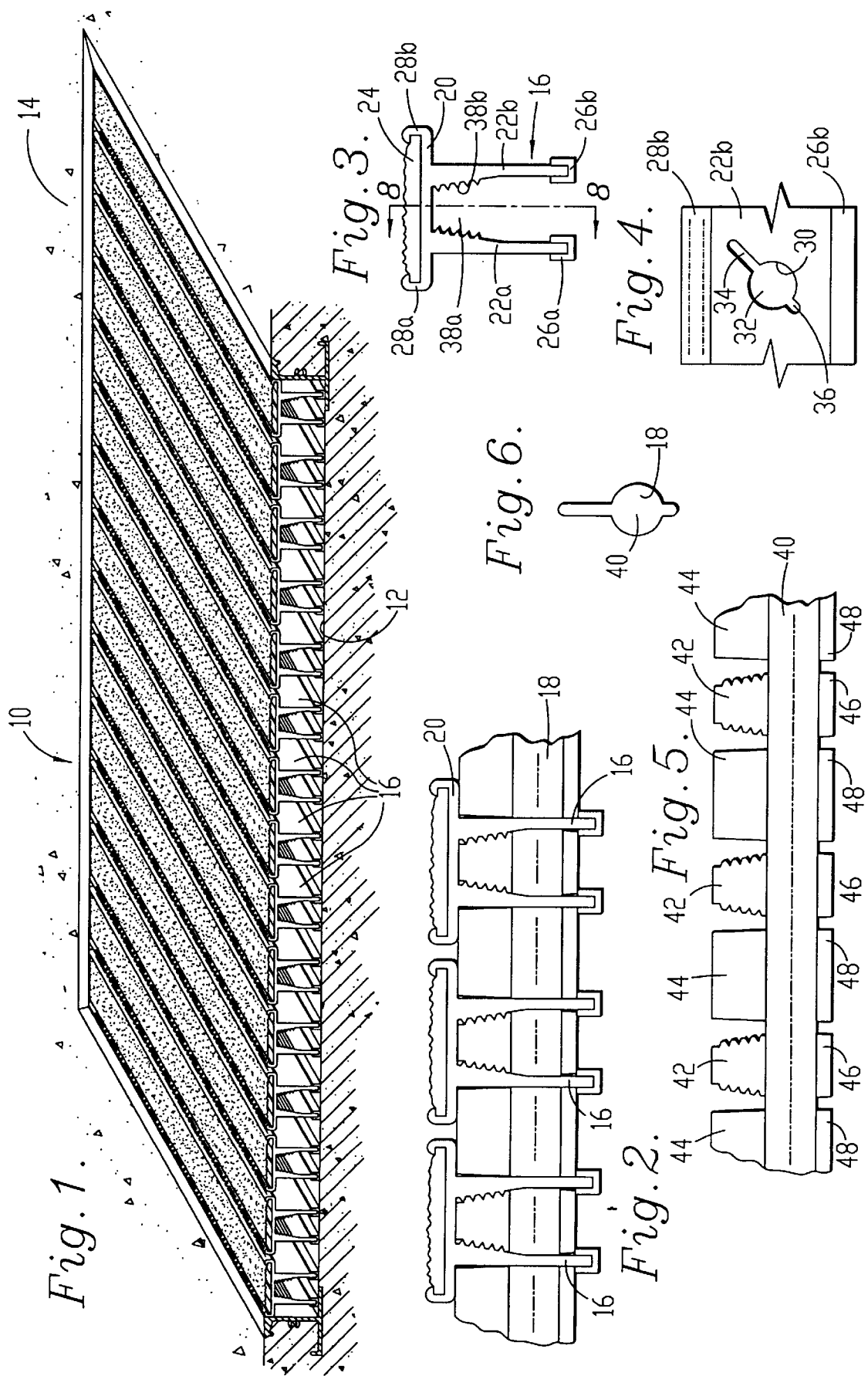

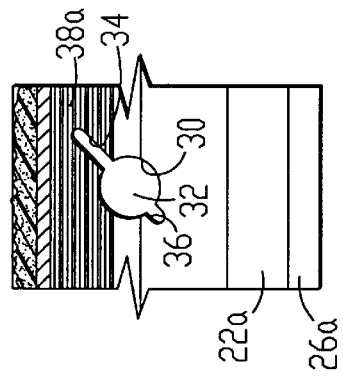
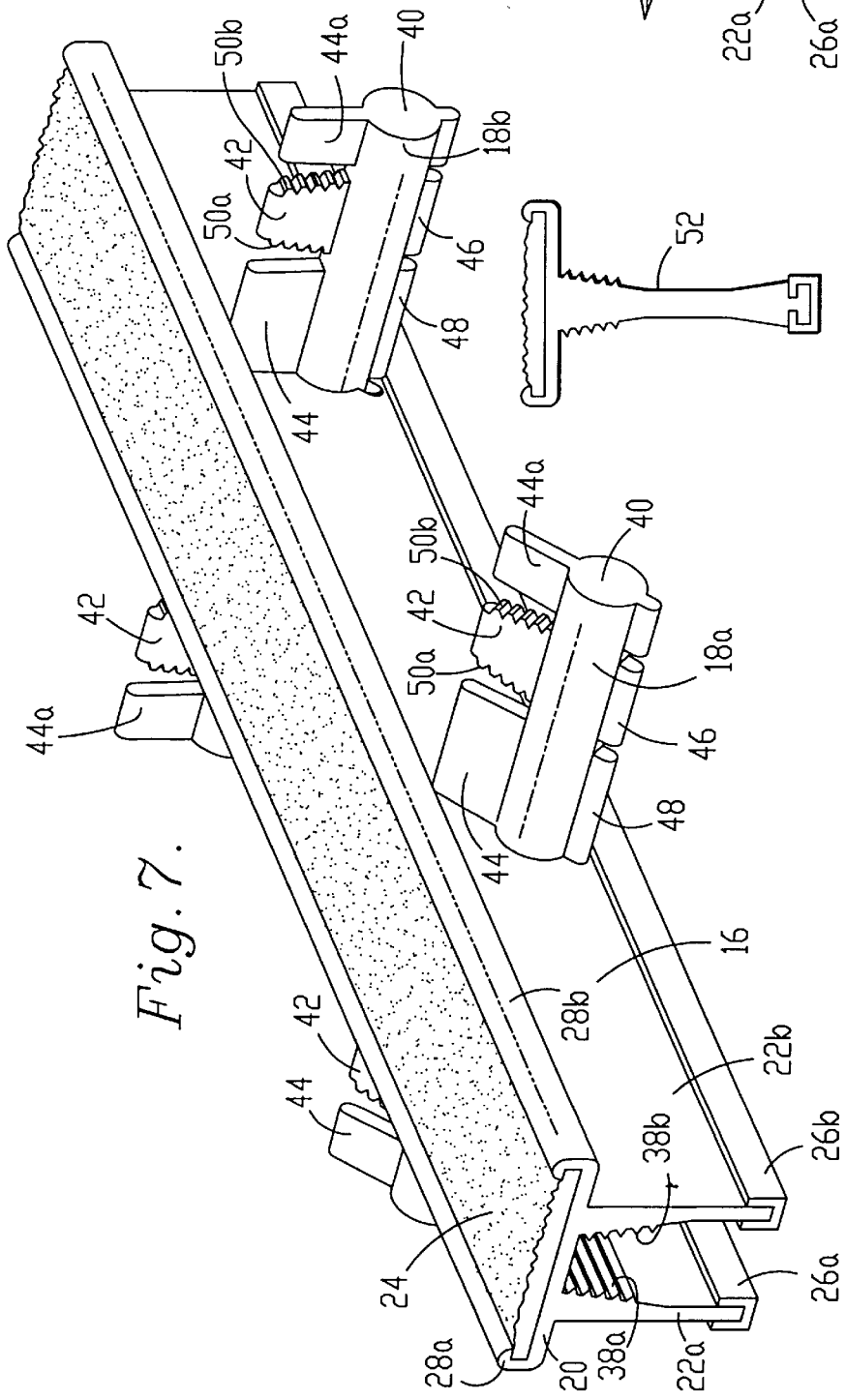

LOCKING ENTRY GRID

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field Of The Invention

The present invention relates to the field of entry grids. In particular, the invention is concerned with an entry grid including a plurality of spaced, side-by-side, grid sections each having a tread rail and a depending support leg with sections interlocked by a locking bar extending transversely through respective locking holes in the support legs. The support legs include locking teeth engaged by complementally configured element teeth of corresponding locking elements extending radially from the locking bar shaft.

2. Description Of The Prior Art

The prior art discloses an entry grid including a plurality of side-by-side grid sections with a threaded cylindrical bar extending transversely through the grids. Nylon spacers are threadably received on the bar between adjacent grid sections in order to place the grid sections in a side-by-side relationship spaced according to the size of the nylon spacers. This type of entry grid presents the disadvantage in that the grid sections are not rigidly coupled. Moreover, each spacer must be installed and adjusted individually thereby slowing installation time.

SUMMARY OF THE INVENTION

The present invention solves the prior art problems discussed above and presents a distinct advance in the state of the art. In particular, the entry grid hereof can be rapidly assembled and presents a rigid structure.

The preferred embodiment includes a plurality of grid sections and locking bars. Each grid section includes a tread rail and at least one depending support leg with a locking hole defined therethrough and with locking teeth adjacent the locking hole. The locking bar includes a shaft with a plurality of spaced, aligned locking elements extending radially therefrom with each element having element teeth complementally configured to engage the locking teeth of the support legs.

The grid section locking holes are in registration and configured to receive the locking bar therethrough in a receiving position. During installation, the locking bar is then rotated to the locked position in which the element teeth of the locking elements engage the locking teeth of the respective support legs thereby locking the entry grids in a spaced, side-by-side relationship to form the entry grid. Other preferred aspects are disclosed herein.

BRIEF DESCRIPTION OF HE DRAWINGS

FIG. 1 is a pictorial view of the preferred entry grid in accordance with the present invention shown positioned in a recess adjacent a walkway;

FIG. 2 is a partial end elevational view of the entry grid of FIG. 1;

FIG. 3 is an end view of a grid section of the entry grid of FIG.1

FIG. 4 is a partial side elevational view of the grid section of FIG. 3 showing a locking hole;

FIG. 5 is a partial side elevational view of the preferred locking of FIG. 1;

FIG. 6 is an end view of the locking bar of FIG. 5;

FIG. 7 is a pictorial view of one grid section of FIG. 1 showing one locking bar in the receiving position and another in the locked position;

FIG. 8 is a partial sectional view taken along line 8—8 of FIG. 3; and FIG. 9 is an end view of one grid section of another embodiment of the invention.

DETAILED DESCRIPTION OF THE PREFERRED EMBODIMENTS

FIG. 1 illustrates preferred entry grid 10 in accordance with the present invention shown installed in recess 12 adjacent walkway 14. Entry grid 10 broadly includes a plurality of identical grid sections 16 and a plurality of identical locking bars 18.

Referring to FIGS. 1–4 and 7–8, each grid section 16 includes tread rail 20, spaced webs or support legs 22*a* and 22*b* depending from tread rail 20, tread insert 24 and U-shaped elastomer cushions 26*a* and 26*b* coupled with the lower edges of legs 22*a,b* respectively. Tread rail 20 includes spaced tread clips 28*a* and 28*b* extending upwardly from opposed sides thereof configured for receiving and holding tread insert 24 as illustrated in the drawing figures. Tread rail 20 and support legs 22*a,b* are integrally formed from extruded aluminum.

As best viewed in FIGS. 4 and 8, each support leg 22*a,b* includes locking hole 30 defined therethrough. Hole 30 presents circular central portion 32, first radial portion 34 extending radially from central portion 32, and shorter, second radial portion 36 also extending radially from central portion 32 opposite first radial portion 34. In the preferred embodiment, each support leg 22*a,b* includes a plurality of locking holes 30 spaced along the length thereof for receiving a respective plurality of locking bars 18.

Support leg 22*a* includes a plurality of locking teeth 38*a* defined on the inboard surface thereof and positioned generally between locking hole 30 and tread rail 20 as best viewed in FIG. 8. Similarly, support leg 22*b* includes a plurality of locking teeth 38*b* defined on the inboard surface thereof and positioned between hole 30 and rail 20. It will be noted that the alignments of teeth 38*a* and 38*b* are at an acute angle relative to the lower portions of the respective support legs 22*a,b*.

Turning to FIGS. 5–7, each locking bar 18 includes circular shaft 40, a plurality of planar locking elements 42, a plurality of planar positioning elements 44, a plurality of planar narrow locking tabs 46 and a plurality of planar wider locking tabs 48. Shaft 40 is configured for reception through the central portions of locking holes 30.

Spaced and aligned elements 42 and 44 alternate along the length of shaft 40 and extend radially therefrom with positioning elements 44 slightly wider than locking elements 42. Elements 42, 44 are configured for reception through first radial portion 44 of locking hole 30.

Narrow locking tabs 46 extend radially from shaft 40 in registration opposite locking elements 42 and present the same width as elements 42. Wider locking tabs 48 alternate with tabs 46, extend radially from shaft 48 in registration opposite positioning elements 44 and present the same width thereof. Tabs 46, 48 are in alignment and configured for reception through second radial portion 36 of locking hole 30.

Each locking element 42 is designed to span the distance between locking teeth 32a,b of support legs 22a,b and includes a first set of element teeth 50a defined on one side thereof complementally configured for engaging locking teeth 38a of a support leg 22a. Similarly, each element 42 includes a second set of element teeth 50b defined on the other side thereof and complementally configured for engaging locking teeth 38b of a support leg 22b.

Positioning elements 44 are designed to define the spacing between adjacent grid sections 16. As best viewed in FIGS. 2 and 5, each positioning element 44 spans the distance between the outboard surfaces of support legs 22a,b of adjacent grid sections 16. The spacing or gap between each positioning element 44 and each locking element 42 is approximately equal to the thickness of each support leg 22a,b as shown in FIG. 2. The spacing or gap between locking tabs 46 and 48 is the same. It will be noted that each locking bar 18 terminates in a positioning element 44a which presents a width about half that of the inboard positioning elements. Positioning elements 44 are configured this way so as not to extend beyond the tread rails of the outermost grid sections.

To install entry grid 10, grid sections 16 are positioned in a side-by-side relationship with locking holes 30 in registration for each locking bar 18. A locking bar 18 is then inserted into and through each locking hole 30 of a registered set with elements 42, 44 in registration with the first radial portion 44 of each locking hole 30. This also registers locking tabs 46, 48 with the second radial portions 36. Locking bar 18 is inserted until the forward end is through the last locking hole in the last support leg. This defines the receiving position as illustrated by the frontmost locking bar 18a in FIG. 7. In this position, positioning elements 44 are generally located between adjacent grid sections 16, and locking elements 42 are generally located between support legs 22a,b of respective grid sections 16.

Locking bar 18 is then rotated counter-clockwise as viewed in FIG. 7 away from the receiving position. As bar 10 rotates, opposite sides of the respective positioning elements 44 engage the outboard surfaces of support legs 22a,b of the respective grid sections in order to position adjacent grid sections 16 with the proper spacing. This also aligns locking elements 42 between support legs 22a,b of respective grid sections 16. As locking bar 18 nears the locked position, element teeth 50a,b of locking elements 42 begin to engage locking teeth 38a,b of support legs 22a,b of respective grid sections 16.

FIG. 7 illustrates locking bar 18b in the locked position. In this position, elements 42, 44 are generally upright and out of alignment with radial portion 34, tabs 46, 48 are out of alignment with radial portion 36, and element teeth 50a,b are fully engaged with the corresponding locking teeth 38a,b (see FIG. 2). Thus, in the locked position, grid sections 16 are locked in a spaced, side-by-side relationship to form entry grid 10. Grid 10 is then placed in recess 12, which is configured so that the upper surfaces of tread inserts 24 are generally flush with walkway 14.

FIG. 9 is an end view illustrating another embodiment 52 of a grid section. In this embodiment, each grid section includes only one support leg 54 with locking teeth 56a and 56b on opposed sides thereof adjacent the tread rail and having locking holes therethrough (not shown). For this embodiment, the locking bars (not shown) are the same as locking bars 18 but include only spaced, aligned locking elements 42 (and no positioning elements) with element teeth 50a,b configured for complementally engaging the locking teeth 56a,b of the respective support legs 54. This embodiment finds utility especially for installations requiring a narrower tread rail.

Those skilled in the art will appreciate that the present invention encompasses many variations in the embodiments described herein. For example, the support legs and locking bar could present relatively smooth, straight or contoured surfaces complementally configured for a snug fit instead of the respective locking teeth and element teeth.

Having thus described the preferred embodiments of the present invention, the following is claimed as new and desired to be secured by Letters Patent:

1. An entry grid comprising:
a plurality of grid sections including respective tread rails and support legs depending therefrom, said support legs including means defining respective locking holes therethrough configured for registration with one another and having respective central portions and radial portions and including means defining a plurality of locking teeth adjacent each of said locking holes; and
a locking bar including
a shaft configured for reception through said central portions, and
a plurality of spaced, aligned, locking elements extending from the periphery of said shaft, configured for reception through said radial portions and having means defining a plurality of element teeth configured for complementally engaging said locking teeth of said respective support legs,
said locking bar being shiftable between
a receiving position in which said bar is received through said locking holes with said locking elements aligned with said radial portions, and
a locked position in which said bar is rotated from said receiving position so that said locking elements are out of alignment with said radial portions and so that said a plurality of element teeth of said locking elements are engaged with said a plurality of locking teeth of said support legs respectively thereby locking said grid sections in a spaced, side-by-side relationship to form said entry grid.

2. The entry grid as set forth in claim 1, each of said grid sections including a pair of said support legs spaced from one another with each of said pair of support legs including said locking teeth on the inboard surfaces thereof, each of said locking elements being configured for reception between a respective pair of said support legs and with said element teeth thereof being configured for engaging said locking teeth of said respective pair of said support legs.

3. The entry grid as set forth in claim 2, said locking bar further including a plurality of spaced positioning elements alternating and aligned with said locking elements and configured for reception between adjacent ones of said grid sections.

4. The entry grid as set forth in claim 1, each of said grid sections including only one of said support legs with each having said locking teeth on opposed sides thereof, said locking elements having said element teeth on opposed sides thereof configured for engaging said locking teeth of adjacent ones of said support legs.

5. The entry grid as set forth in claim 1, for each grid section, said locking teeth being positioned between said locking hole and said rail and extending along the length of said grid section.

6. The entry grid as set forth in claim 1, each of said grid sections being formed of extruded aluminum.

7. The entry grid as set forth in claim 1, each of said rails including a tread thereon.

8. The entry grid as set forth in claim 7, each of said rails including a tread insert including said tread.

9. The entry grid as set forth in claim 1, adjacent ones of said rails having a space therebetween with said locking bar in said locked position.

10. The entry grid as set forth in claim 1, each of said support legs having a plurality of said locking holes, said entry grid including a plurality of said locking bars in correspondence with said plurality of said locking holes.

11. The entry grid as set forth in claim 1, said locking bar including a plurality of spaced, aligned locking tabs extending from the periphery thereof opposite said locking elements, each of said locking holes including a second radial portion configured for receiving said locking tabs.

12. An entry grid comprising:
   a plurality of grid sections including respective tread rails and support legs depending therefrom, said support legs including means defining respective locking holes therethrough configured for registration with one another and having respective central portions and radial portions and including means defining locking surfaces adjacent each of said locking holes; and
   a locking bar including
      a shaft configured for reception through said central portions, and
      a plurality of spaced, aligned, locking elements extending from the periphery of said shaft, configured for reception through said radial portions and having means defining element surfaces configured for complementally engaging said locking surfaces of said respective support legs,
   said locking bar being shiftable between
      a receiving position in which said bar is received through said locking holes with said locking elements aligned with said radial portions, and
      a locked position in which said bar is rotated from said receiving position so that said locking elements are out of alignment with said radial portions and so that said element surfaces of said locking elements are engaged with said locking surfaces of said support legs respectively for locking said grid sections in a spaced, side-by-side relationship to form said entry grid, each of said grid sections including a pair of said support legs spaced from one another with each of said pair of support legs including said locking surfaces on the inboard surfaces thereof each of said locking elements being configured for reception between a respective pair of said support legs and with said element surfaces thereof being configured for engaging said locking surfaces of said respective pair of said support legs.

13. The entry grid as set forth in claim 12, said locking bar further including a plurality of spaced positioning elements alternating and aligned with said locking elements and configured for reception between adjacent ones of said grid sections.

14. The entry grid as set forth in claim 12, each of said grid sections including only one of said support legs with each having said locking surfaces on opposed sides thereof, said locking elements having said element surfaces on opposed sides thereof configured for engaging said locking surfaces of adjacent ones of said support legs.

15. The entry grid as set forth in claim 12, for each grid section, said locking surfaces being positioned between said locking hole and said rail and extending along the length of said grid section.

16. The entry grid as set forth in claim 12 each of said grid sections being formed of extruded aluminum.

17. The entry grid as set forth in claim 12, each of said rails including a tread thereon.

18. The entry grid as set forth in claim 17, each of said rails including a tread insert including said tread.

19. The entry grid as set forth in claim 12, adjacent ones of said rails having a space therebetween with said locking bar in said locked position.

20. The entry grid as set forth in claim 12, each of said support legs having a plurality of said locking holes, said entry grid including a plurality of said locking bars in correspondence with said plurality of said locking holes.

21. The entry grid as set forth in claim 12, said locking bar including a plurality of spaced, aligned locking tabs extending from the periphery thereof opposite said locking elements, each of said locking holes including a second radial portion configured for receiving said locking tabs.

22. The entry grid as set forth in claim 12, said locking surfaces being configured to present locking teeth, said element surfaces being configured to present element teeth configured for complementally engaging said locking teeth.

* * * * *